United States Patent
Ehmer et al.

(10) Patent No.: US 7,016,778 B1
(45) Date of Patent: Mar. 21, 2006

(54) METHOD FOR CONTROLLING A VEHICLE

(75) Inventors: Norbert Ehmer, Eschborn (DE); Georg Roll, Heusenstamm (DE); Lothar Kienle, Lampertheim (DE); Bernd-Uwe Hartmann, Grundau (DE); Steffen Ritz, Kirchheim (DE); Frank Haller, Frankfurt (DE)

(73) Assignee: Continental Teves, AG & Co. oHG, Frankfurt (DE)

(*) Notice: Subject to any disclaimer, the term of this patent is extended or adjusted under 35 U.S.C. 154(b) by 0 days.

(21) Appl. No.: 09/914,807

(22) PCT Filed: Feb. 28, 2000

(86) PCT No.: PCT/EP00/01657

§ 371 (c)(1),
(2), (4) Date: Feb. 19, 2002

(87) PCT Pub. No.: WO00/51862

PCT Pub. Date: Sep. 8, 2000

(30) Foreign Application Priority Data

Mar. 4, 1999 (DE) .......................... 199 09 454
Nov. 9, 1999 (DE) .......................... 199 53 773

(51) Int. Cl.
*G06F 7/00* (2006.01)

(52) U.S. Cl. ........................ 701/82; 180/197
(58) Field of Classification Search ............ 701/82; 180/197
See application file for complete search history.

(56) References Cited

U.S. PATENT DOCUMENTS

| | | | | |
|---|---|---|---|---|
| 3,707,298 A | * | 12/1972 | Henry et al. | 280/124.116 |
| 4,589,511 A | | 5/1986 | Leiber | |
| 5,329,453 A | * | 7/1994 | Tsuyama et al. | 701/83 |
| 5,373,447 A | * | 12/1994 | Howes et al. | 701/91 |
| 5,644,488 A | | 7/1997 | Ito et al. | |
| 5,804,935 A | * | 9/1998 | Radev | 318/139 |
| 5,839,741 A | * | 11/1998 | Heyring | 280/124.106 |
| 5,862,503 A | * | 1/1999 | Eckert et al. | 701/78 |
| 5,980,000 A | * | 11/1999 | Kolbe et al. | 303/139 |
| 6,314,342 B1 | * | 11/2001 | Kramer et al. | 701/1 |
| 6,398,318 B1 | * | 6/2002 | Braun | 303/122.03 |
| 6,505,893 B1 | * | 1/2003 | Schmidt et al. | 303/122.09 |
| 2003/0144786 A1 | * | 7/2003 | Hessmert et al. | 701/82 |

FOREIGN PATENT DOCUMENTS

WO        WO 00/51862        *  9/2000

OTHER PUBLICATIONS

English Abstract of German Patent DE 19537991 to Wangler Werner published Apr. 7, 1997.

* cited by examiner

*Primary Examiner*—William A. Cuchlinski, Jr.
*Assistant Examiner*—Olga Hernandez (57) ABSTRACT

The invention relates to a method for controlling a motor vehicle, in particular a traction-slip control system (TCS), wherein a diagonal axle twist is detected and evaluated as a regulating variable.

24 Claims, 3 Drawing Sheets

METHOD FOR CONTROLLING A VEHICLE

FIELD OF THE INVENTION

The present invention relates to a method for controlling a vehicle, in particular a traction-slip control system, as well as a method and circuit arrangement for detecting a diagonal axle twist in a vehicle with all-wheel drive.

BACKGROUND OF THE INVENTION

Vehicle control systems which reduce the wheel slip to a value appropriate for ensuring traction and driving stability by building up brake pressure on the overspeeding drive wheels and applying a stronger drive torque to the wheels with tire contact are known from the prior art. These systems are available both for two-wheel drive and all-wheel drive vehicles. These vehicle control systems are called traction-slip control systems (TCS), or also "Electronic Differential Lock", "Automatic Stability Control," and "Traction Control System".

Two designs have to be differentiated with respect to traction-slip control systems: traction-slip control and brake traction-slip control or brake traction-control systems. The first, i.e. traction-slip control system, additionally throttles the engine torque in certain situations in order to keep the load on the brakes as low as possible. The brake traction-slip control systems become effective only through automatic braking intervention. In the following, "TCS" refers to all feasible traction-slip control systems, i.e. those with and without intervention in the engine management.

Traction-slip control systems basically are configured for primarily level ground and road usage characterized by an at least approximately identical friction coefficient on both sides.

When an all-wheel drive vehicle without axle differential lock drives over a diagonal furrow, causing the diagonally opposite front wheel and rear wheel to lose contact to the ground, these two wheels spin and so prevent any drive torque from being applied to the two wheels touching the ground (the two opposite wheels along the other vehicle diagonal). Since the vehicle Is twisted considerably, this situation should be overcome as quickly as possible. For this purpose, strong tractive power is necessary to move the vehicle. An uphill road or an abrupt obstacle, for example a stone, lying in front of one or several wheels makes the situation even more difficult.

BRIEF SUMMARY OF THE INVENTION

In this case, sufficient traction can only be obtained with the help of a differential lock, because practical experience has shown that the measures realized in previous TCS systems have not sufficed since usually exceedingly large slip values at the spinning wheels are tolerated. The brake pressure on the relieved wheels is not maintained in the brakes long enough and, hence, a locking effect comparable to that of a differential lock is not achieved.

The driven wheels of a vehicle diagonal are alternately subject to traction slip and the engine torque oscillates between the wheels involved depending on the current wheel load, brake pressure and engine torque. The pressure modulation in the driven wheels follows the traction slip. A stationary state is not reached. The vehicle becomes stuck.

The problem is to be illustrated on the basis of the following description.

The power consumed ("PB") in a wheel rotating at a constant speed ("U/t") and constant brake pressure ("FB") is:

$$PB = FB*vB = FB*2*\pi*r_{eff}*U/t \quad (1)$$

Here, $r_{eff}$ is the effective wheel radius, on which the brake force acts. U/t is to be stated as wheel rotations per second.

Taking as an example the assumption that the left front wheel and right rear wheel spin on a diagonal furrow and are braked by the traction control, the following equations can be derived for the power consumed:

$$PB1 = FB1*vB1 = FB1*2*\pi*r_{eff1}*U1/t \quad (2.1)$$

$$PB3 = FB3*vB3 = FB3*2*\pi*r_{eff3}*U3/t \quad (2.2)$$

The wheel indices are selected clockwise:

FB1=left front wheel
FB2=right front wheel
FB3=left rear wheel
FB4=right rear wheel Assuming that the brakes have approximately the same dimensions on the wheels and the speed of the spinning wheels, as well as the brake force also are equal, the sum performance can be simplified as follows:

$$PBges = FB*4*\pi*r_{eff}*U/t \quad (3)$$

The total braking torque ("MBges") applied by the wheels, which acts on the other wheels—via the axle differentials or center differential—as total drive torque ("Mages") comes to:

$$MAges_{spinning\ wheels} = MAges_{(tractive\ wheels)} = FB*2\ r_{eff} \quad (4)$$

Equation (3) makes evident that the entire engine power can be easily consumed with a sufficiently high speed, U/t, of the spinning wheels and medium brake force, FB. When the brake forces, FB, are too small, only a negligible drive torque is provided according to equation (4). However, in extreme off-road driving situations, especially in the event of diagonal twist, a high peak torque is required at least for a short time to free the motor vehicle from the difficult situation.

This situation occurs relatively frequently on bumpy ground, since strong unevenness at first always causes one wheel to lose contact with the ground and tilting along a diagonal, which does not include the wheel that is off the ground. The wheel located diagonally to the wheel off the ground also will lose its tire contact force, either completely or partially, depending on the direction of tilt and inclined position of the motor vehicle.

Therefore, it is an object of the present invention to improve a method for controlling a motor vehicle, in particular for driving situations on bumpy ground. Moreover, one embodiment provides a method and a circuit arrangement, which definitely detect a diagonal axle twist, in particular one caused by a driving situation on bumpy ground with diagonal furrows or abrupt obstacles.

The object according to one embodiment of the present invention is solved by a method for controlling a motor vehicle, in particular a traction-slip control system (TCS), which is characterized in that a diagonal axle twist is detected and evaluated as a regulating variable.

According to the method proposed in one embodiment of the present invention for controlling a motor vehicle, the situation of a diagonal axle twist is determined first. Then the state of the axle twist is evaluated as a regulating variable for the vehicle control. According to this regulating variable, systematic intervention, in particular of the vehicle control system, in, for example, the brake control, engine management, transmission function and/or function of differential locks can be initiated.

According to one embodiment of the present Invention, the effect of locking partially or completely a center, front axle and/or rear axle differential is achieved with means of the vehicle control system, especially by measuring and/or modulating the brake pressure in the wheel brakes of the controlled wheels, and/or a center, front axle and/or rear axle differential is locked partially or completely with the help of a differential lock, if available.

At first the method necessarily demands that the need for a diagonally locked state be recognized and that such a diagonally locked state subsequently be achieved with means of the vehicle control system, preferably by controlling the brakes with the traction-slip control, wherein one or several available differential locks, for example a center differential lock, may additionally be activated. However, it is also possible to activate one or several available differential locks alternatively to the brake control. Furthermore, according to the present invention, intervention in the engine management is to occur in addition to brake intervention, for example by means of such control elements as throttle valve or ignition.

One embodiment of the present invention provides that, following the detection of the diagonal axle twist, a medium brake pressure level be set at the wheel brakes of the controlled wheels with a minimal drive slip corresponding to the required traction and that this be maintained for a certain period of time.

Sufficient traction is obtained in this case by maintaining the brake pressure at the relieved wheels for a period of time to achieve a locking effect comparable to that of a differential lock until the situation of the diagonal axle twist has been overcome. In this way the above-mentioned periodic oscillation of the engine torque between the wheels of a vehicle diagonal will be safely avoided, after the axle twist was detected by the method according to the invention, by preventing any lagging of the brake pressure. The locked state of the differentials or the comparable effect of a locked state preferably is maintained for a period of time that is sufficient for moving the vehicle over the obstacle. The speed ("U/t") of the spinning wheels is reduced by stronger braking. Thus, there is a significant increase in comfort, scraping of the wheels is basically prevented and the engine speed remains constant and relatively low. In addition, tire wear is minimized.

According to the invention, the wheels concerned are controlled with relatively low slip values, preferably less than 30 km/h, so that higher pressure levels are set at the wheel brakes. For this purpose, the spinning wheels are braked down to traction slip values close to zero (0) in extreme cases.

Increased build-up and delayed reduction of the brake pressure can be achieved in an advantageous manner by changing the pressure build-up and reduction gradients. The pressure modulation also can be changed by building up pressure quicker and reducing pressure more slowly. This can be achieved by shortening the interval time during the pressure build-up and extending the interval time when the pressure is being reduced, always keeping the pressure build-up and pressure reduction pulses unchanged or by enlarging the pressure build-up pulses and reducing the pressure reduction pulses with unchanged interval times.

According to the invention, the control threshold of the traction-slip control system also is lowered following the detection of a diagonal axle twist.

By lowering the control thresholds of the traction-slip control, the drive slip is reduced additionally. This manipulation of the control threshold, when the off-road situation of a diagonal axle twist has been detected, preferably occurs only on the wheels that are in an active traction-slip control. Then only the wheels concerned are controlled with small thresholds so as to avoid that stable wheels come into a traction slip control phase.

According to another embodiment of the invention, it is provided that the detected diagonal axle twist be evaluated as a regulating variable and/or a corresponding control function of the vehicle control system be activated only when the vehicle speed, in particular a calculated or estimated vehicle reference speed, falls below a specified vehicle speed limit value, preferably between 3 to 15 km/h, in particular about 6 km/h. Since a diagonal axle twist basically is a standard situation on bumpy roads and, hence, particularly in off-road driving situations, a center, front axle and/or rear axle differential is locked partially or completely and/or this kind of effect is only executed with means of the traction-slip control system if the vehicle speed is correspondingly low.

According to this embodiment of the invention, a diagonal axle twist of a vehicle with all-wheel drive and a vehicle control system, in particular a traction-slip control system (TCS), is detected by means of a method that is characterized in that the diagonal axle twist is determined on the basis of the wheel slip, rotating behavior and/or changes in rotating behavior of the individual driven wheels.

Within the scope of this embodiment of the invention, the term "vehicles with all-wheel drive" comprises vehicles where at least four wheels are driven permanently on at least two driven axles and vehicles driven primarily with one axle, where a second axle can be added whenever necessary. This can be done manually or automatically, for example with the help of a viscous transmission unit.

Preferably this method allows the detection of such situations as when an all-wheel drive vehicle drives through a diagonal furrow when driving off-road. By determining the rotating behavior or changes in rotating behavior, it can, in particular, be determined when a diagonally opposite front wheel and rear wheel lose contact to the ground and these two wheels spin.

According to a preferred embodiment of the invention, the rotating behavior of the individual driven wheels is measured and evaluated to determine the traction slip and other regulating variables, and a diagonal axle twist is determined on the basis of a drive slip of the individual wheels greater than a specified limit value.

According to an embodiment of the invention, it is provided that a diagonal axle twist is determined on the basis of the rotating behavior and/or changes in rotating behavior of at least two transversally opposite wheels as well as two diagonally opposite pairs of wheels.

Within the scope of the invention, the term "transversally opposite wheels" means that two wheels are transversally opposite one another related to the longitudinal vehicle axis. Thus, it refers to one right wheel and one left wheel of a wheel axle. The term "two diagonally opposite pairs of wheels" refers to the two wheels located opposite one another along a vehicle diagonal respectively, i.e. the right front wheel and left rear wheel (first vehicle diagonal) or the left front wheel and right rear wheel (second vehicle diagonal).

According to an embodiment of the invention, it is provided that a diagonal axle twist is determined when certain traction slip conditions are fulfilled for a predefined period of time.

According to an embodiment of the invention, a diagonal axle twist is determined when the following conditions are fulfilled for a predefined period of time, i.e. a) a traction slip higher than a specified limit value prevails only on one wheel of the secondary axle; b) a traction slip higher than a specified limit value prevails on both of two diagonally opposite wheels of a pair of wheels; and c) a traction slip lower than a specified limit value prevails on a first wheel of the primary axle, with such first wheel lying opposite a second wheel of the primary axle with a traction slip higher than the specified limit value or at least a lower brake pressure, compared to the second wheel of the primary axle with a traction slip higher than the specified limit value, prevails in the wheel brake of the first wheel of the primary axle, with such first wheel lying opposite the second wheel of the primary axle with a traction slip higher than the specified limit value.

In this context the term "primary axle" refers to the axle driven first by the engine or, in general, the axle having a higher drive torque or greater tire contact forces. In addition, the primary axle is characterized in that the wheels of the primary axle, assuming identical driving conditions, enter into a traction slip before the wheels of the secondary axle. The axle which transmits no or only a low drive torque in a state without traction slip is referred to as the "secondary axle" here. Only when there is a corresponding difference speed will a large drive torque be transmitted by this secondary axle corresponding to the traction-slip control.

According to an embodiment of the invention, the state of a diagonal axle twist is determined when the conditions a) to c) are satisfied for a period of time of 0.3 to 1.5 sec. The exact value can be determined individually by relatively few trials. It depends on the dynamics of the drive train of the respective motor vehicle. In one case, for example, a value of about 0.7 sec. has proven to be particularly suitable.

According to the invention, a diagonal axle twist is determined when the defined traction-slip conditions are satisfied for a relatively short period of time, preferably 50 to 200 msec., in particular about 100 msec., and if the last diagonal axle twist was determined at least several seconds, preferably 5 to 15 sec., in particular about 10 sec., before. In other words, the diagonal axle twist is already detected when the pattern or the conditions of the traction slip is given within a relatively short period of time of, for example, about 100 msec., and when the situation of a diagonal axle twist was already determined before, within a trail time of, for example, about 10 sec.

According to the present invention, it is provided that a traction slip related to the wheel rotation speed of the spinning wheel, between 10 km/h to 40 km/h, preferably about 30 km/h, be specified as traction-slip limit value.

According to another embodiment of the invention, it is also provided that the traction-slip limit value on one wheel be considered exceeded when a control procedure of the traction-slip control system is initiated or maintained at the respective wheel. The traction-slip control system is active when it controls pressure build-up, and the holding of the pressure or reduction of pressure at the respective wheel brake.

In connection with the method for controlling a vehicle, in particular a traction-slip control system (TCS), the diagonal axle twist is determined with the help of a method according to one of the claims 6 to 13. Thus, it is ensured that the diagonal axle twist is definitely detected.

Furthermore, the partial object is solved by means of a circuit arrangement, designed to detect a diagonal axle twist of a motor vehicle with all-wheel drive and a traction-slip control system, with such vehicle exhibiting a detection circuit for detecting measured changes in the rotating behavior of the driven wheels, wherein the circuit arrangement is characterized in that the circuit arrangement exhibits a first detection circuit for detecting a diagonal axle twist of the vehicle on the basis of the changes in rotating behavior of the driven wheels determined by the detection circuit.

According to an embodiment of the Invention, the circuit arrangement is characterized in that the first detection circuit exhibits a first evaluation circuit for evaluating a slip of the wheels on the secondary axle, that the first detection circuit exhibits second and third evaluation circuits for evaluating a slip of the wheels of the two diagonally opposite pairs of wheels respectively, that the first detection circuit exhibits a fourth evaluation circuit for evaluating a slip of the wheels on the primary axle and that the first detection circuit exhibits an integrator and a signal generator to generate a signal when, with the help of the evaluation, certain slip conditions typical for a diagonal axle twist are detected by the first, second, third and fourth evaluation circuits.

According to an embodiment of the invention, it is provided that a second detection circuit be associated with the first detection circuit in order to determine a vehicle reference speed on the basis of measured values, and that the first detection circuit exhibit a comparator to compare the determined vehicle reference speed with a predefined limit value, with the first detection circuit generating a signal indicating a diagonal axle twist only when the determined vehicle reference speed falls below the predefined value.

BRIEF DESCRIPTION OF THE DRAWINGS

The invention is to be described in more detail using two flow diagrams (FIG. 1 and FIG. 2) and a block diagram (FIG. 3).

DETAILED DESCRIPTION OF THE INVENTION

At the beginning after the Start (Step 8), In FIG. 1, a low vehicle speed or vehicle reference speed ($V_{ref}$) lying below a speed threshold (VS) is required as a basic condition for detecting a slip condition of a diagonal axle twist. Since, in the case of a diagonal axle twist, the two wheels in contact with the ground usually do not overspeed, an estimated vehicle reference speed ($V_{ref}$) corresponds quite well to the actual vehicle speed. In order to avoid unlearning the pattern when starting, preferably a $V_{ref}$ less than 3 to 15 km/h, e.g. less than about 6 km/h, is required. Contrary to the given concrete example of an embodiment (constant value), this speed threshold (VS) can also be a function of detection safety, because when there is a relatively high pressure level and relatively strong intervention of the traction-slip control, the vehicle speed, as a rule, will be relatively low, causing the above condition to be fulfilled.

In addition, the traction-slip control may only be active on one of the two wheels of the secondary drive axle, i.e. on wheels 3 and 4 of the above-mentioned definition (wheel 1=left front, wheel 2=right front, wheel 3=right rear, wheel 4=left rear), which is observed in the following. When the criterion of a low vehicle reference speed (Step 10) is satisfied, this requirement is checked in Step 11 with the query 'TCS at Wheel 3 not active or TCS at Wheel 4 not active'.

When condition 11 is satisfied, the query continues to step 12, where the condition 'TCS at Wheel 1 active and TCS at Wheel 3 active' (Case A) is checked. If the traction-slip control at Wheel 1 and Wheel 3 is not active, the corresponding condition 'TCS at Wheel 2 active and TCS at Wheel 4 active' (Case B) is checked In a subsequent step 13. Through queries 12 and 13, the occurrence of slip in the diagonally opposite pairs of wheels Wheel 1 and Wheel 3 in Case A as well as Wheel 2 and Wheel 4 in Case B are detected.

As far as the wheels of the primary drive axle (Wheel 1 and Wheel 2) are concerned, traction-slip control should intervene only at the wheel that is diagonal to the controlled wheel of the secondary axle. Hence, the conditions are checked in Step 14 for Case A—corresponding to an TCS controlled Wheel 1—'TCS at Wheel 2 not active' and in Step 15—corresponding to an TCS controlled Wheel 2—according to Case B 'TCS at Wheel 1 not active'. In certain situations these requirements may not be satisfied, e.g. in the event of a short "loss of contact" of a wheel having relatively good tire contact, since traction-slip control can occur here for a short time. For this reason, at least a small model pressure is required for the wheel lying opposite the mainly controlled wheel (Wheel 1 in Case A and Wheel 2 in Case B). The pressure referred to as "model pressure" here means a pressure calculated for a certain wheel brake.

When the conditions of Steps 9, 11, 12 and 14 in Case A and Steps 9, 11, 13 and 15 in Case B are satisfied, the slip conditions of a diagonal axle twist are given. These are detected in Step 16; otherwise they will not be detected (Step 17).

The above-mentioned slip conditions or traction-slip control conditions for a diagonal axle twist of a motor vehicle with primary front axle drive can, for example, be detected with the following query:

If($V_{ref}$)<VS)

and a wheel of the secondary axle is not active and ((TCS active at Wheel 1 and TCS active at Wheel 3 and ((model pressure Wheel 1>=model pressure Wheel 2)

or TCS is not active at Wheel 2

)

)

or ((TCS active at Wheel 1 and TCS active at Wheel 3 and ((model pressure Wheel 1>=model pressure Wheel 2)

or TCS is not active at Wheel 2.

There result analog relationships for primary rear axle drive, with the pressure conditions and the condition 'TCS not active' applying correspondingly to the wheels of the rear axle (wheels 3 and 4).

Figure 1:
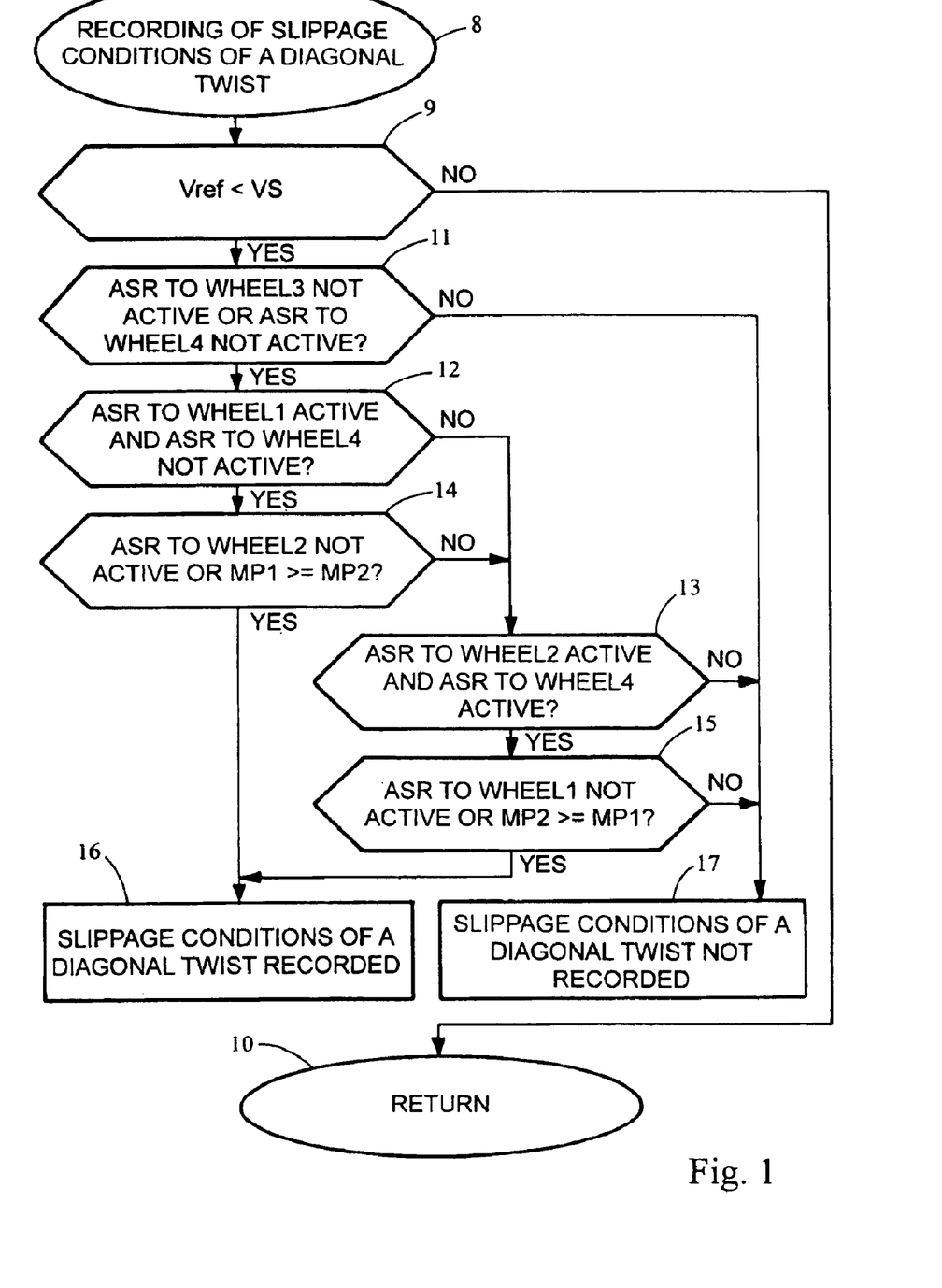
FIG. 1 is a flow diagram of an embodiment of the method according to the invention for detecting slip conditions of a diagonal axle twist in a motor vehicle with a primary front-wheel drive in a traction-slip control system.
Figure 2:
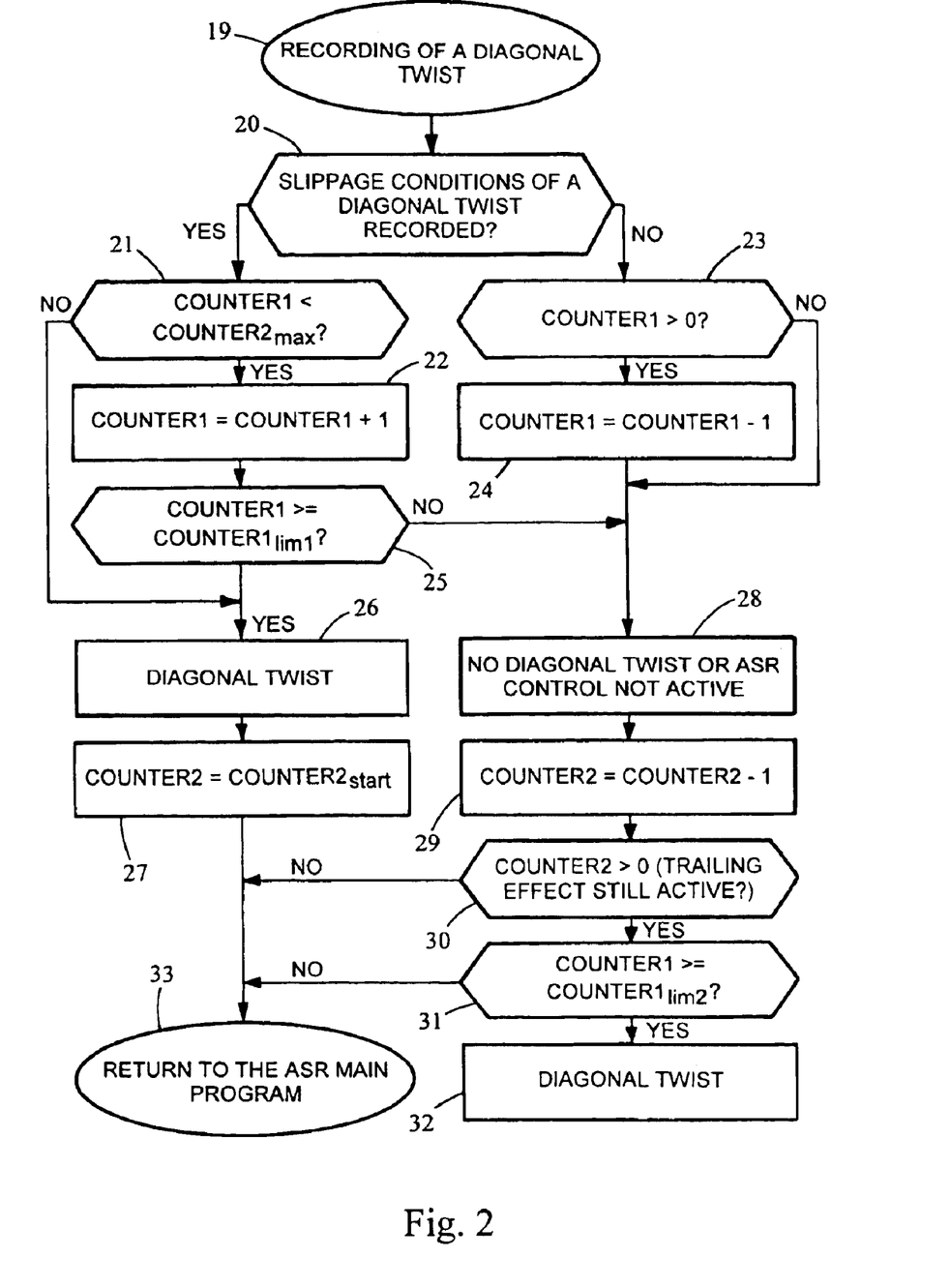
FIG. 2 is a flow diagram of an embodiment of the method according to the invention for determining a diagonal axle twist after the slip conditions of a diagonal axle twist, in particular according to the sequence shown in FIG. 1, were detected.

Following the detection of the slip conditions of a diagonal axle twist in a traction-slip control cycle (Step 16) shown in FIG. 1, the condition of a diagonal axle twist is determined, preferably according to the flow diagram shown in FIG. 2 (Step 19). When the slip conditions for a diagonal axle twist in a traction-slip control cycle are detected (Step 20), an incorporated first counter (COUNTER1) is incremented by 1 in subsequent Step 22 provided the value of the first counter lies below a certain maximum value (COUNTER1$_{max}$) (Step 21).

If, however, the slip conditions in Step 20 are not satisfied and if the first counter has a value greater than zero (0) (Step 23), the first counter is decremented by 1 in subsequent Step 24, with such decrementation being continued up to the value zero (0).

These conditions, for example, can be recognized with the following query:

```
If (above condition satisfied)
{
    If (COUNTER1 < COUNTER1_max)
    COUNTER1 = COUNTER1 + 1
}
Otherwise (if above condition not satisfied)
{
    If COUNTER1 > 0)
    COUNTER1 = COUNTER1 - 1
}
```

Following Step 22, Step 25 then checks whether the value of the first counter exceeds a threshold value (COUNTER1$_{lim1}$), with such threshold value lying below the maximum value COUNTER1$_{max}$. If the first counter is greater than the threshold value COUNTER1$_{lim1}$, this means that the above-mentioned conditions were recognized consecutively over a certain period of time, for example 0.3 to 1.5 sec., preferably about 0.7 sec. It is assumed that the situation of a diagonal axle twist was detected (Step 26). Then a signal indicating a diagonal axle twist can be generated, for example, a special control bit can be set; alternatively it can be deleted.

This can be executed with the help of the following query steps:

If

COUNTER1>COUNTER1$_{lim}$)

There is diagonal axle twist

Otherwise (if COUNTER1<COUNTER1$_{lim1}$)

There is no diagonal axle twist

Since COUNTER1 can count up to COUNTER1$_{max}$ and the situation above the value COUNTER1$_{lim1}$ is considered to be detected, the mechanism has a "memory" of COUNTER1$_{max}$ minus COUNTER1$_{lim1}$ multiplied by the cycle time. Another trail effect will occur as a rule because the control phases at the diagonal are maintained longer than the situation of the diagonal axle twist.

In order to avoid this, a second counter (COUNTER2) is set to a start value COUNTER2$_{start}$ (Step 27) when a diagonal axle twist is detected. If a diagonal axle twist is not detected (Step 28) or outside an active traction-slip control, this counter is decremented to the value zero (0) within a specified time (Step 29). This period of time, for example, may be 10 sec. If the traction-slip control becomes active again due to overspeeding drive wheels within this "trail time" and if the above-mentioned conditions still prevail (Step 30), then, if COUNTER1 has reached, in comparison to the value COUNTER1$_{lim1}$, a significantly lower value, preferably a value lower by 80 to 90%, COUNTER1$_{lim2}$ (Step 31), the control bit will be set (Step 32). Otherwise the system returns to the main program of the traction-slip control (Step 33). Consequently, the detection time is reduced considerably in this situation, and the above-mentioned disadvantage is avoided.

With the help of the following query, these conditions (COUNTER2) can be detected:

If ((COUNTER2>0)

and (slip conditions of a diagonal axle twist detected)

and (TCS active)

Then if (COUNTER1>=COUNTER1$_{lim2}$)

diagonal twist detected

According to this embodiment of the invention, all steps described above can be realized by means of a program-controlled circuit as corresponding program steps or through a sub-program within a traction-slip control system.

Figure 3:
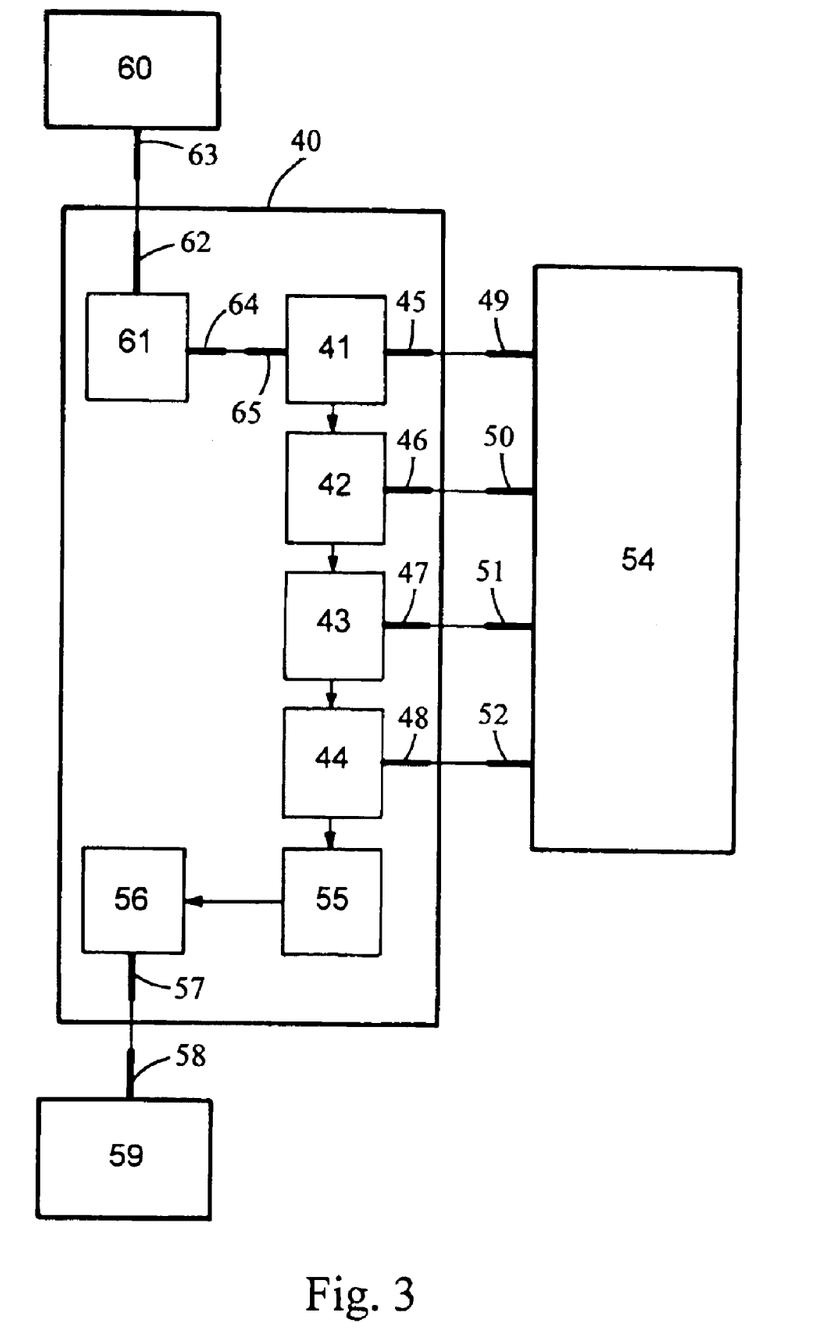
FIG. 3 is a block diagram of an embodiment of the circuit arrangement according to the invention for detecting a diagonal axle twist.

However, the steps also can be realized with the help of a circuit arrangement. FIG. 3 shows the block diagram of a circuit arrangement which illustrates, by way of example, the essential electric and electronic components of an embodiment designed to detect a diagonal axle twist according to the present invention.

An essential part of this embodiment of the invention is the first detection circuit 40. A first, second, third and fourth evaluation circuit 41, 42, 43, 44 for evaluating a slip of the wheels on the secondary axle (circuit 41), the wheels of the two diagonally opposite pairs of wheels (circuit 42 and 43), and the wheels on the primary axle (circuit 44) are associated with the first detection circuit 40. Inputs 45, 46, 47, 48 of the evaluation circuits 41, 42, 43, 44 are connected to corresponding outputs 49, 50, 51, 52 of a detection circuit 54 for detecting the measured rotating behavior or changes in rotating behavior or traction slip of the individual driven wheels. The first detection circuit 40 also exhibits an integrator 55 and a signal generator 56. When, based on the evaluation of the first, second, third and fourth evaluation circuits, inputs 45, 46, 47, 48 of the evaluation circuits 41, 42, 43, 44 detected typical slip conditions for a diagonal axle twist over a predefined period of time with the help of integrator 55, a signal is generated with the help of signal generator 56 and supplied to an input 58 of a control circuit 59 via an output 57 of the signal generator 56 in order to trigger corresponding traction-slip control intervention. In a preferred embodiment it is provided that a second detection circuit 60 be associated to the first detection circuit 40 for determining a vehicle reference speed on the basis of measured values and that the first detection circuit 40 exhibit a comparator 61, with such comparator 61 exhibiting an input 62 for a signal coming from an output 63 of the second detection circuit 60 for the determined vehicle reference speed. With the help of comparator 61, the determined vehicle reference speed is compared to a predefined limit value. For this purpose, the comparator 61 is connected to an input 65 of the evaluation circuit 41 via an output 64 and, either directly or through circuits not described in detail here, it generates a signal so that the evaluation by the evaluation circuits 41, 42, 43, 44 only occurs if the vehicle reference speed is less than the specified limit value. In this case, the first detection circuit 40 will only generate a signal indicating a diagonal axle twist if the determined vehicle reference speed falls below the specified value, i.e., particularly in connection with a driving situation in "difficult" terrain at low vehicle speeds.

What is claimed is:

1. A method for controlling a vehicle an all wheel drive system and having a traction-slip control system (TCS) monitoring the behavior of the vehicle wheels, comprising the steps of:

detecting a diagonal axle twist condition in which two diagonally opposite wheels lose sufficient traction with the ground;

evaluating the diagonal axle twist as a regulating variable of the traction slip control system; and     providing torque to at least one vehicle wheel having sufficient traction with the ground that is not one of the two diagonally opposite wheels in the diagonal axis twist condition.

2. The method according to claim 1 wherein the torque providing step includes:

effecting at least a partial lock of a differential within the vehicle, upon detection of a diagonal axle twist.

3. The method according to claim 2 wherein the effecting step at least partially locks at least one of a center differential, a front differential and a rear differential.

4. The method according to claim 2 wherein the effecting step Et least partially locks a differential by way of the traction control system.

5. The method according to claim 2 wherein the effecting step at least partially locks a differential by way of a differential lock.

6. The method according to claim 1 wherein the torque providing step includes:

setting a medium brake pressure level at wheel brakes of controlled wheels with minimum traction slip upon detection of diagonal axle twist, the medium brake pressure corresponding to required traction; and maintaining the medium brake pressure level for a period of time.

7. The method according to claim 1 further comprising the step of:

reducing a control threshold of the function slip control system upon detection of a diagonal axle twist.

8. The method according to claim 1 wherein said evaluating step is performed only when vehicle speed falls below a specified vehicle speed limit value.

9. The method according to claim 8 wherein said speed limit value Is within the range of 3 to 15 kilometers per hour.

10. A method for detecting a diagonal axle twist of a motor vehicle, said motor vehicle having an all-wheel drive system, a vehicle control system and a traction control system, comprising the steps of:

comparing a characteristic of each of the individual, driven wheels, to the other driven wheels, the characteristic being at least one of wheel slip, rotating behavior and changes in rotating behavior; and     identifying a diagonal axle twist condition in which two diagonally opposite wheels have lost sufficient traction with the ground based on the comparison of the characteristic.

11. The method according to claim, 10 wherein the rotating behavior includes the traction slip of the individual wheels, and further comprising the step of determining whether the traction slip is greater than a specified limit value.

12. The method according to claim 10 wherein the characteristics of at least two transversally opposite wheels are compared.

13. The method according to claim 11 further comprising the step of:

determining the diagonal axle twist when certain traction-slip conditions are satisfied for a period of time.

14. The method according to claim 13 wherein the traction-slip conditions include the traction slip being greater than a specified limit value on only one wheel of a secondary axle.

15. The method according to claim 13 wherein the traction-slip conditions Include the traction slip being greater than a specified limit value on both of two diagonally opposite wheels.

16. The method according to claim 13 wherein the traction-slip conditions Include the traction slip being less than a specified limit value on a first wheel of a primary axle, the first wheel lying opposite a second wheel on said first axle, such second wheel having greater than the traction-slip specified limit value.

17. The method according to claim 13 wherein the period of time is 0.3 to 1.5 seconds.

18. The method according to claim 13 wherein the period of time is 50 to 200 msec. when a diagonal axle twist was previously determined within 15 seconds of the step of determining the diagonal axle twist.

19. The method according to claim 14 wherein the specified limit value is within the range of 10 kilometers per hour to 40 kilometers per hour.

20. The method according to claim 14 wherein the specified limit value Is considered to have been exceeded when a control procedure of the traction control system is activated at a wheel.

21. A circuit arrangement for detecting a diagonal axle twist of a motor vehicle, said motor vehicle having an all-wheel drive system and a traction-slip control system, the arrangement comprising:

a first detection circuit for detecting measured changes in the rotating behavior of a set of driven wheels, the flit detection circuit including a first evaluation circuit evaluating the slip of the wheels on a secondary axle;

a second and a third evaluation circuit evaluating the slip of two diagonally opposite wheels for detecting a diagonal axle twist on two diagonally opposite wheels;

a fourth evaluation circuit evaluating the slip of the wheels on a primary axle;

an integrator, and a signal generator.

22. The circuit according to claim 21 further comprising a second detection circuit capable of detecting the vehicle reference speed on the basis of measured values; a comparator on said first detection circuit where the comparator is capable of comparing the vehicle reference speed with a specified limit value; and a signal generated by the first detection circuit when the vehicle reference speed falls below the specified value.

23. The circuit according to claim 10, wherein the identifying step is performed upon detection of a vehicle reference speed that falls below a predetermined value.

24. The circuit according to claim 10 further comprising the step of reducing a control threshold of the traction slip control system upon identification of a diagonal axle twist.

* * * * *

UNITED STATES PATENT AND TRADEMARK OFFICE
CERTIFICATE OF CORRECTION

PATENT NO.       : 7,016,778 B1
APPLICATION NO.  : 09/914807
DATED            : March 21, 2006
INVENTOR(S)      : Norbert Ehmer et al.

It is certified that error appears in the above-identified patent and that said Letters Patent is hereby corrected as shown below:

In the Claims

Column 10, in claim 4, line 11, before "least partially" delete "Et" and substitute --at-- in its place.

Column 10, in claim 7, line 26, before "slip control" delete "function" and substitute --fraction-- in its place.

Column 10, in claim 9, line 32, before "within the range" delete "Is" and substitute --is-- in its place.

Column 10, in claim 15, line 63, before "the traction" delete "Include" and substitute --include-- in its place.

Column 10, in claim 16, line 67, before "the traction" delete "Include" and substitute --include-- in its place.

Column 11, in claim 20, line 15, before "considered to have" delete "Is" and substitute --is-- in its place.

Column 11, in claim 21, line 23, after "driven wheels, the" delete "flit" and substitute --first-- in its place.

Column 12, in claim 21, line 6, immediately after "an integrator" delete "," (comma) and substitute --;-- (semicolon) in its place.

Signed and Sealed this

Fifth Day of December, 2006

JON W. DUDAS
*Director of the United States Patent and Trademark Office*